United States Patent [19]

Wendler et al.

[11] 3,926,840

[45] Dec. 16, 1975

[54] EMULSIFIERS OF WATER-IN-OIL CREAMS

[75] Inventors: Ingrid Wendler, Dusseldorf-Wersten; Jurgen Malaszkiewicz, Dusseldorf, both of Germany

[73] Assignee: Henkel & Cie GmbH, Dusseldorf-Holthausen, Germany

[22] Filed: Aug. 15, 1973

[21] Appl. No.: 388,557

[30] Foreign Application Priority Data

Aug. 21, 1972 Germany............................ 2241016

[52] U.S. Cl. ........... 252/356; 252/309; 252/DIG. 1; 424/168; 424/172
[51] Int. Cl.$^2$ ......................................... B01F 17/34
[58] Field of Search...................... 252/356, DIG. 1

[56] References Cited

UNITED STATES PATENTS

| 2,114,490 | 4/1938 | Harris............................ 252/311 X |
| 3,821,121 | 6/1974 | Julian.................................. 252/351 |

*Primary Examiner*—Richard D. Lovering
*Attorney, Agent, or Firm*—Hammond & Littell

[57] ABSTRACT

Emulsifier combinations containing mixtures of vegetable sterols and of monoesters and polyesters of oleic acid and/or ricinoleic acid with polyhydroxyl compounds having at least 3 alcoholic hydroxyl groups in the molecule, as well as skin creams containing these combinations.

10 Claims, No Drawings

EMULSIFIERS OF WATER-IN-OIL CREAMS

THE PRIOR ART

One of the most important bases, even today, of emulsifiers for the production of creams of the water-in-oil type is wool fat with its derivatives. Despite its undeniable advantages, wool fat and its derivatives have, however, certain disadvantages. There are a considerable number of persons who suffer from a wool fat allergy and who cannot use a skin cream with an emulsifier based on a wool fat for this reason. Another disadvantage is that conventional water-in-oil emulsifiers based on wool fat and its derivatives impart a strong intrinsic odor to the creams produced from them. This in turn requires more perfuming, which is poorly tolerated by persons with sensitive skin and by those persons suffering from allergies. But this influence on the quality of the cream by a strong intrinsic odor is characteristic not only of wool fat and its derivatives, but is also characteristic of lanolin-free water-in-oil emulsifiers based on animal sterols, particularly when based on cholesterol.

OBJECTS OF THE INVENTION

It is an object of the present invention to provide an emulsifier combination for use in preparing creams of the water-in-oil type consisting of (A) vegetable sterols and (B) an ester mixture selected from the group consisting of (1) monoesters of oleic acid with polyols having at least 3 hydroxyl groups in the molecule and polyesters of oleic acid with polyols having at least 3 hydroxyl groups in the molecule, (2) monoesters of ricinoleic acid with polyols having at least 3 hydroxyl groups in the molecule and polyesters of ricinoleic acid with polyols having at least 3 hydroxy groups in the molecule, and (3) the mixtures of (1) and (2) above, the weight ratio of said ester mixture to said vegetable sterols ranging from 90:10 to 50:50, with the proviso that the amount of free hydroxyl groups in said ester mixture exceeds the amount of esterified hydroxyl groups in said ester mixture.

This and other objects of the present invention will become apparent as the description thereof proceeds.

DESCRIPTION OF THE INVENTION

The present invention concerns new emulsifier combinations of mixtures of vegetable sterols and of monoesters and polyesters of oleic acid and/or ricinoleic acid with polyhydroxyl compounds having at least 3 alcoholic hydroxyl groups in the molecule, as well as skin creams containing these emulsifiers.

More particularly the present invention provides an emulsifier combination for use in preparing creams of the water-in-oil type consisting of (A) vegetable sterols and (B) an ester mixture selected from the group consisting of (1) monoesters of oleic acid with polyols having at least 3 hydroxyl groups in the molecule and polyesters of oleic acid with polyols having at least 3 hydroxyl groups in the molecule, (2) monoesters of ricinoleic acid with polyols having at least 3 hydroxyl groups in the molecule and polyesters of ricinoleic acid with polyols having at least 3 hydroxy groups in the molecule, and (3) the mixtures of (1) and (2) above, the weight ratio of said ester mixture to said vegetable sterols ranging from 90:10 to 50:50, with the proviso that the amount of free hydroxyl groups in said ester mixture exceeds the amount of esterified hydroxyl groups in said ester mixture.

The mixtures of monoesters and polyesters of oleic acid and/or ricinoleic acid used according to the invention can be derived from said acids and from the following polyhydroxy compounds: alkanetriols having 3 to 6 carbon atoms such as glycerol, alkanetetrols having 4 to 6 carbon atoms such as erythritol or pentaerythritol, alkanepentaols having 5 to 6 carbon atoms such as arabitol or xylitol, and hexanehexaols such as mannitol, sorbitol or dulcitol; polyglycerols having 2 to 20 glycerol units, preferably 2 to 10 glycerol units of the formula

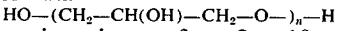

$$HO-(CH_2-CH(OH)-CH_2-O-)_n-H$$

where $n$ is an integer from 2 to 10, such as diglycerol, triglycerol, tetraglycerol, pentaglyceryl, hexaglycerol, heptaglycerol, octaglycerol, nonaglycerol, or decaglycerol; monosaccharides such as mannose, glucose or fructose; and polysaccharides such as saccharose, maltose or lactose.

The presence of free hydroxyl groups in the ester mixture is generally necessary to produce a good emulsion, and it is preferred to have less than one-half of the total number of hydroxyl groups of the polyol esterified. In other words the amount of free hydroxyl groups exceeds the amount of esterified hydroxyl groups.

The ester mixtures are generally mixtures of monoesters, diesters and triesters, in which the amount of the triesters can increase with the number of hydroxyl groups in the polyhydroxyl compound. In the case of oleic acid glycerides, the mixture consists predominantly of monooleate and dioleate, with a minor amount of trioleate.

Suitable examples of usable and technically available ester mixtures are as follows: A mixture of a major glycerol monooleate and glycerol dioleate with a minor portion of glycerol trioleate, for example the trademarked product "Arlacel" 186; a mixture of tetraglycerol monooleate, dioleate and trioleate; a mixture of decaglycerol monooleate, dioleate, and trioleate; a mixture of decaglycerol monoricinoleate, diricinoleate and triricinoleate; a mixture of sorbitol monoleate, dioleate, and trioleate, for example the trademarked product Arlacel 83; a mixture of sorbitol monoricinoleate, diricinoleate and triricinoleate; a mixture of saccharose monooleate, dioleate and trioleate; and a mixture of saccharose monoricinoleate, diricinoleate and triricinoleate.

The vegetable sterols used in the emulsifier combinations according to the invention are mixtures of various sterol substances with small amounts of inert accompanying substances of vegetable origin which do not affect the emulsifier combination. Suitable examples of definite constituents of the vegetable sterols include a mixture of at least two sterols of the group sitosterol, campesterol, stigmasterol, brassicusterol, α-spinasterol, sargasterol, or fucosterol in varying quantitative ratios. Preferred for the vegetable sterols is a mixture of sitosterol, campesterol, and stigmasterol.

The quantitative weight percent ratios in the emulsifier combinations of ester mixtures to sterols according to the invention range between 90:10 and 50:50 percent by weight, preferably between 85:15 and 70:30 percent by weight.

In the production of an emulsion, particularly a skin cream of the water-in-oil type, 2% to 10% by weight, preferably 3% to 6% by weight of the emulsifier combination according to the invention are used and based upon the total composition of the emulsion or skin cream.

The skin creams to be produced by means of the emulsifier combination according to the invention additionally contain the usual cream constituents, such as various fatty substances, metal soaps, glycerol and other smoothing additives, preservatives, perfume and water. Suitable examples of fatty substances include (a) those of ozocerites, origin, such as vaselin, paraffin oil, solid paraffin waxes, ozocerities, and ceresines; (b) those of animal origin such as various triglycerides and waxes for example spermaceti wax, beeswax, and (c) those of vegetable origin such as various oils, if necessary in their hydrogenated form, as well as technical products for example fatty alcohols, aceto fats, and special fatty acid esters.

The emulsifier combinations according to the invention have the advantages of permitting the production of stable emulsions and creams of the water-in-oil type, without the necessity of using other emulsifiers. Thus skin creams can be produced which are free of wool fat, wool fat derivatives and wool fat fractions, and which are often superior in their emulsifying properties to the products obtained by means of wool fat and its derivatives. In addition to these advantages, the present invention has the very important advantage that the emulsifier combinations are not subject to any limitation regarding their use, since the creams containing them can also be used by persons who suffer from a wool fat allergy. Furthermore they permit a more economical use of perfumes in the end products, due to their odorlessness or very weak intrinsic odor which in turn results in a much better tolerability by the skin.

Preferred among the emulsifier combinations according to the invention are those which contain saccharose esters as a component of the mixture. From among the saccharose esters, the saccharose oleates were found to be especially preferred. The emulsions and skin creams produced by means of the emulsifier combinations according to the invention based on saccharose esters with a suitable selection of the other constituents are practically odorless. For persons with a particularly sensitive skin who are also allergic to perfumes, it is possible to produce from these ingredients, creams of the water-in-oil type without the addition of any perfume.

The preferred saccharose oleates represent mixtures of the following composition: saccharose monooleate 5% to 20% by weight, preferably 10% to 15% by weight, saccharose dioleate 30% to 70% by weight, preferably 40% to 60% by weight, saccharose trioleate 65% to 10% by weight, preferably 50% to 25% by weight.

Mixtures with the vegetable sterols in the above mentioned weight percent ratios, particularly within the limits 85:15 to 70:30 percent by weight, represent the preferred formulations of the emulsifier combinations according to the invention, both in terms of the excellent emulsifying properties and in terms of negligible or nonexistent odor and excellent tolerability by human skin.

For the production of the desired water-in-oil emulsions, the emulsifier combinations were heated together with the fat phase to 50°C to 70°C. Into the above mentioned fat phase, the water phase which had been heated to 50°C to 75°C was then stirred. The stirring was continued until the mixture became cold. After the temperature had dropped to about 30°C, the desired perfume, if any, was added, and at about 25°C the mass was homogenized on the roller mill, in an emulsion producing device, or in any other homogenizing apparatus suitable for water-in-oil creams.

It was found expedient for the processing of emulsifier combinations to first produce, under slight preheating, premixes with fatty substances which contain high emulsifier portions of about 50%. In general the premixes contain from 20% to 50% by weight of the ester mixture, from 5% to 20% by weight of vegetable sterols, and from 35% to 75% by weight of liquid paraffin oils. Preferably the premixes contain from 33% to 43% by weight ester mixture, from 7% to 17% by weight vegetable sterols and from 44% to 50% by weight paraffin oil in liquid form. These premixes are added to the fat phase so as to constitute from 10% to 40% by weight, and preferably from 16.9% to 36.4% by weight of the fat phase which is then combined with the water phase so as to produce a cream of the water-in-oil type, as discussed below.

Suitable examples of these premixes include:

| | | parts by weight |
|---|---|---|
| A. | the above saccharose oleate mixture | 40 |
| | vegetable sterols | 10 |
| | liquid paraffin oil | 50 |
| B. | the saccharose oleate mixture | 42.5 |
| | vegetable sterols above | 7.5 |
| | liquid paraffin oil | 50.0 |
| C. | the saccharose oleate mixture | 37.5 |
| | vegetable sterols above | 12.5 |
| | liquid paraffin oil | 50.0 |

These pre-mixes are watery, almost transparent, and very easy to process. About 4% to 20%, preferably 6% to 12% by weight of these premixes are used based upon the finally produced emulsion.

Instead of using the saccharose oleate mixture it is also possible to use a mixture of the above mentioned saccharose ricinoleates, decaglycerol oleates, sorbitan oleates, glycerol monooleate and glycerol dioleate in these premixes.

By using these premixes with liquid paraffin oil the fat phase only has to be heated to about 50°C and the water phase to about 60°C. The higher the amount of liquid paraffin oil used, the lower usually is the melting point of the premix and the fat phase. Time and energy can thus be saved, and the cream base is subjected to less thermal stress.

The following examples are merely illustrative of the present invention without being deemed limitative in any manner thereof.

EXAMPLES

For the production of the emulsifier combinations to be used in the various examples for skin creams, a saccharose oleate mixture containing the following portions of monoesters, diesters, triesters was prepared.

| | |
|---|---|
| Saccharose monoleate | 13% by weight |
| Saccharose dioleate | 46% by weight |
| Saccharose trioleate | 41% by weight |

The vegetable sterols used were a mixture of the following composition:

| | |
|---|---|
| Sitosterol | 53% by weight |
| Campesterol | 32% by weight |

-continued

| | |
|---|---|
| Stigmasterol | 6% by weight |
| Accompanying substances of vegetable origin | 9% by weight |

Compositions of individual water-in-oil emulsions are reported below in Tables 1 and 2.

TABLE 1

| Constituents | Emulsions | | | |
|---|---|---|---|---|
| | 1 % by weight | 2 % by weight | 3 % by weight | 4 % by weight |
| Fat phase | | | | |
| Vaseline | 15.5 | 18.0 | 20.0 | 16.0 |
| Isopropyl myristate | 5.0 | 3.0 | 4.0 | 2.0 |
| Liquid Paraffin Oil | 5.0 | 4.0 | 3.0 | 6.0 |
| Zinc stearate | 2.0 | — | — | — |
| Calcium stearate | — | 2.0 | — | — |
| Aluminum stearate | — | — | 1.5 | — |
| Magnesium stearate | — | — | — | 2.0 |
| Solid paraffin (solidification point about 70°C) | — | — | 2.0 | 2.0 |
| Beeswax | 2.0 | 2.0 | — | — |
| Saccharose oleate mixture) | 2.0 | 3.0 | 4.0 | 3.4 |
| Vegetable sterol ) pre- | 1.0 | 1.0 | 1.0 | 0.6 |
| Liquid paraffin oil ) mix | 3.0 | 4.0 | 5.0 | 4.0 |
| Water phase | | | | |
| Glycerol 86% to 87% | 1.0 | 2.0 | 2.0 | 2.5 |
| Magnesium sulfate | 0.2 | 0.2 | 0.5 | 0.3 |
| Preservative | 0.2 | 0.2 | 0.2 | 0.2 |
| Water | 63.0 | 60.6 | 56.6 | 60.8 |
| Perfume | 0.1 | — | 0.2 | 0.2 |

TABLE 2

| Constituents | Emulsions | | |
|---|---|---|---|
| | 5 % by weight | 6 % by weight | 7 % by weight |
| Fat phase | | | |
| Vaseline | 20.0 | 20.0 | 16.5 |
| Isopropyl myristate | 4.0 | 2.0 | — |
| Liquid paraffin oil | 7.0 | 4.0 | 5.0 |
| Zinc stearate | — | — | — |
| Calcium stearate | — | — | 3.0 |
| Aluminum stearate | — | — | — |
| Solid paraffin (solidification point about 70°C) | 3.0 | 2.5 | 2.0 |
| Beeswax | — | — | 1.0 |
| Saccharose oleate mixture) | 4.25 | 3.2 | 3.75 |
| Vegetable sterol ) premix | 0.75 | 0.8 | 1.25 |
| Liquid paraffin oil ) | 5.0 | 4.0 | 5.0 |
| Water phase | | | |
| Glycerol 86% to 87% | 2.0 | 3.0 | 2.5 |
| Magnesium sulfate | 0.4 | 0.3 | 0.4 |
| Preservative | 0.2 | 0.2 | 0.2 |
| Water | 53.4 | 59.9 | 59.4 |
| Perfume | — | 0.1 | — |

For the production of the emulsions, the fat phase including the premix was heated to about 50°C. The water phase was heated to about 60°C and was stirred into the fat phase. Then the mixture was stirred while it cooled to room temperature, with perfume being added when the temperature had dropped to 30°C in the respective cases; and the mass was homogenized at 25°C on a rolling mill.

The resulting emulsions had the new and unexpected results of possessing great stability, odorlessness and, where perfumed, having a particularly clean development of the odor. They could be readily spread on the skin without producing a sticky feeling, and they were highly tolerated by the skin.

Utilizing an analogous procedure for producing the emulsions listed in the foregoing Tables 1 and 2, emulsions were produced based upon combinations of glycerol monooleate and glycerol dioleate with small portions of glycerol trioleate (Trademark Arlacel 186) and the vegetable sterol, as well as based upon combinations of sorbitan monooleate, sorbitan dioleate, and sorbitan trioleate (Trademark Arlacel 83) and the vegetable sterol. The water-in-oil compositions are compiled below in Tables 3 and 4.

TABLE 3

| Constituents | Emulsions | | |
|---|---|---|---|
| | 8 % by weight | 9 % by weight | 10 % by weight |
| Fat phase | | | |
| Vaseline | 16.0 | 1.50 | 20.0 |
| Isopropyl myristate | 2.0 | 3.0 | — |
| Liquid paraffin oil | 3.0 | 4.0 | 4.0 |
| Zinc stearate | 3.0 | — | — |
| Magnesium stearate | — | 2.0 | — |
| Beeswax | — | 2.0 | — |
| Solid paraffin (solidification point about 70°C) | 1.0 | — | 1.0 |
| Glycerol mono-, di-, trioleate ("Arlacel" 186) premix | 2.0 | 3.0 | 3.2 |
| Vegetable sterol | 1.0 | 1.0 | 0.8 |
| Liquid paraffin oil | 3.0 | 4.0 | 4.0 |
| Water phase | | | |
| Glycerol | 3.0 | 2.0 | 3.0 |
| Magnesium sulfate | 0.3 | 0.2 | 0.4 |
| Preservative | 0.2 | 0.2 | 0.2 |
| Water | 65.2 | 63.4 | 63.1 |
| Perfume | 0.3 | 0.2 | 0.3 |

TABLE 4

| Constituents | Emulsions | | |
|---|---|---|---|
| | 11 % by weight | 12 % by weight | 13 % by weight |
| Fat Phase | | | |
| Vaseline | 18.0 | 17.0 | 20.0 |
| Isopropyl myristate | 2.0 | — | 2.0 |
| Liquid paraffin oil | 4.0 | 4.0 | 3.0 |
| Aluminum stearate | — | 1.0 | — |
| Calcium stearate | 2.0 | — | — |
| Beeswax | — | — | 2.0 |
| Solid paraffin (solidification point about 70°C) | 2.0 | 3.0 | — |
| Sorbitan mono-,di-and trioleate) ("Arlacel" 83) | 3.0 | 3.75 | 2.0 |
| Vegetable sterols } pre- | 1.0 | 1.25 | 1.0 |
| Liquid paraffin oil ) mix | 4.0 | 4.0 | 3.0 |
| Water phase | | | |
| Glycerol | 1.0 | — | 3.0 |
| Magnesium sulfate | 0.3 | 0.2 | 0.4 |
| Preservative | 0.2 | 0.2 | 0.2 |
| Water | 62.1 | 65.1 | 63.0 |
| Perfume | 0.4 | 0.5 | 0.4 |

The emulsions obtained with the premixes of glycerol monooleate, glycerol dioleate and glycerol trioleate mixture, as well as with premixes of sorbitan monooleate, sorbitan dioleate, and sorbitan trioleate mixture and vegetable sterols have the new and unexpected advantages of great stability and a very weak intrinsic odor, so that perfuming even with delicate flower fragrances is readily possible. These emulsions could also be easily spread on the skin without producing a sticky feeling, and they were highly tolerated by the skin.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. An emulsifier combination for use in preparing creams of the water-in-oil type consisting of (A) vegetable sterols and (B) an ester mixture selected from the group consisting of (1) monoesters of oleic acid with polyols having at least 3 hydroxyl groups in the molecule and polyesters of oleic acid with polyols having at least 3 hydroxyl groups in the molecule, (2) monoesters of ricinoleic acid with polyols having at least 3 hydroxyl groups in the molecule and polyesters of ricinoleic acid with polyols having at least 3 hydroxyl groups in the molecule, and (3) and the mixtures of (1) and (2) above, the weight ratio of said ester mixture to said vegetable sterols ranging from 90:10 to 50:50, with the proviso that the amount of free hydroxyl groups in said ester mixture exceeds the amount of esterified hydroxyl groups in said ester mixture.

2. The emulsifier combination of claim 1, in which the ratio of said ester mixture to said sterol is from 85:15 to 70:30 percent by weight.

3. The emulsifier combination of claim 1, in which said vegetable sterols consist of a mixture of at least two vegetable sterols selected from the group consisting of sitosterol, campesterol, stigmasterol, brassicusterol, α-spinasterol, sargasterol, and fucosterol.

4. The emulsifier combination of claim 1, in which said vegetable sterols are a mixture consisting of sitosterol, campesterol, and stigmasterol.

5. The emulsifier combination of claim 1, in which said polyol having at least 3 hydroxyl groups in the molecule is selected from the group consisting of alkanetriols having 3 to 6 carbon atoms, alkanetetrols having 4 to 6 carbon atoms, alkanepentols having 5 to 6 carbon atoms, hexanehexols, polyglycerols having 2 to 20 glycerol units, monosaccharides, polysaccharides, and the mixtures thereof.

6. The emulsifier combination of claim 1, in which said polyol having at least 3 hydroxyl groups in the molecule is selected from the group consisting of glycerol, erythritol, arabitol, xylitol, mannitol, sorbitol, dulcitol, polyglycerols having 2 to 10 glycerol units, mannose, glucose, fructose, saccharose, maltose, and lactose.

7. The emulsifier combination of claim 1, in which said ester mixture of (B) is selected from the group consisting of a mixture consisting of a major portion of glycerol monooleate and glycerol dioleate with a minor portion of glycerol trioleate, a mixture consisting of tetraglycerol monooleate, tetraglycerol dioleate and tetraglycerol trioleate, a mixture consisting of decaglycerol monooleate, decaglycerol dioleate and decaglycerol trioleate, a mixture consisting of decaglycerol monoricinoleate, decaglycerol diricinoleate and decaglycerol triricinoleate, a mixture consisting of sorbitol monooleate, sorbitol dioleate and sorbitol trioleate, a mixture consisting of sorbitol monoricinoleate, sorbitol diricinoleate and sorbitol triricinoleate, a mixture consisting of saccharose monooleate, saccharose dioleate and saccharose trioleate, a mixture consisting of saccharose monoricinoleate, saccharose diricinoleate and saccharose triricinoleate, and the mixtures thereof.

8. The emulsifier combination of claim 7, in which said ester mixture consists of from 5% to 20% by weight of saccharose monooleate, from 30% to 70% by weight of saccharose dioleate, and from 65% to 10% by weight of saccharose trioleate.

9. The emulsifier combination of claim 8, in which said ester mixture consists of from 10% to 15% by weight of saccharose monooleate, 40% to 60% by weight of saccharose dioleate, and from 50% to 25% by weight of saccharose trioleate.

10. An emulsifier combination according to claim 1, which consists of (A) vegetable sterols and (B) an ester mixture consisting of saccharose monooleate, saccharose dioleate and saccharose trioleate.

* * * * *